(12) United States Patent
Castrigno

(10) Patent No.: US 11,421,795 B2
(45) Date of Patent: Aug. 23, 2022

(54) RELIEF VALVE

(71) Applicant: Watts Regulator Co., North Andover, MA (US)

(72) Inventor: Steven Castrigno, Chester, NH (US)

(73) Assignee: Watts Regulator Co., North Andover, MA (US)

(*) Notice: Subject to any disclaimer, the term of this patent is extended or adjusted under 35 U.S.C. 154(b) by 41 days.

(21) Appl. No.: 16/815,867

(22) Filed: Mar. 11, 2020

(65) Prior Publication Data

US 2021/0285559 A1 Sep. 16, 2021

(51) Int. Cl.
- F16K 17/04 (2006.01)
- F16K 31/56 (2006.01)
- F16K 15/14 (2006.01)

(52) U.S. Cl.
CPC ...... F16K 17/0486 (2013.01); F16K 15/1441 (2021.08); F16K 31/563 (2013.01); *Y10T 137/7888* (2015.04)

(58) Field of Classification Search
CPC ........ F16K 7/17; F16K 15/025; F16K 15/033; F16K 15/063; F16K 15/14; F16K 15/141; F16K 15/144; F16K 15/145; F16K 15/18; F16K 15/181; F16K 15/185; F16K 17/0486; F16K 31/563; F16K 15/035; F16K 15/1441; Y10T 137/7879; Y10T 137/7887; Y10T 137/7888; Y10T 137/789; Y10T 137/7891; Y10T 137/7892
USPC ............ 137/843, 851, 852, 854–859, 115.18
See application file for complete search history.

(56) References Cited

U.S. PATENT DOCUMENTS

| | | | |
|---|---|---|---|
| 2,634,748 A | 4/1953 | Morrison | |
| 2,638,109 A * | 5/1953 | Wahlmark | F16K 17/10 137/115.14 |
| 2,827,921 A * | 3/1958 | Sherman | F16K 15/033 137/527 |
| 4,303,376 A * | 12/1981 | Siekmann | F04B 43/067 417/360 |

(Continued)

OTHER PUBLICATIONS

AGF Manufacturing, Inc.; www.Inspectorstest.com; Sprinklers-Saves, Inspectors Test Vales Sell Sheet; 2008-2015, 5 pages.

(Continued)

*Primary Examiner* — Kenneth Rinehart
*Assistant Examiner* — Jonathan J Waddy
(74) *Attorney, Agent, or Firm* — Day Pitney LLP; George N. Chaclas

(57) ABSTRACT

A relief valve provides pressure relief when a fluid line exceeds a predetermined pressure. The valve includes a body which defines a cavity between inlet and outlet flowpaths. The valve includes a lever arm, which pivots around a pivot point as the valve changes between open and closed positions. A plunger assembly is disposed in the cavity and seals the cavity from the inlet and outlet flowpaths in the closed position. Fluid pressure from the inlet flow path causes the plunger assembly to contact the lever arm to urge the lever arm to rotate. The lever arm engages a spring at a further distance from the pivot point than the plunger assembly, the spring resisting pivoting of the lever arm and urging the valve to remain in the closed position unless a predetermined pressure is exceeded.

19 Claims, 6 Drawing Sheets

(56) References Cited

U.S. PATENT DOCUMENTS

| | | | | |
|---|---|---|---|---|
| 4,681,518 | A | * | 7/1987 | Credle, Jr. .............. F04B 9/127 |
| | | | | 417/395 |
| 5,101,799 | A | * | 4/1992 | Davis ................ F02M 21/0215 |
| | | | | 123/527 |
| 5,117,798 | A | * | 6/1992 | Nozaki .............. F02M 21/0239 |
| | | | | 123/527 |
| 5,588,462 | A | | 12/1996 | McHugh |
| 5,613,420 | A | * | 3/1997 | Glockemann ......... F04B 9/1053 |
| | | | | 91/404 |
| 5,662,139 | A | | 9/1997 | Lish |
| 6,131,552 | A | * | 10/2000 | Paielli ............... F02M 21/0233 |
| | | | | 123/527 |
| 6,186,169 | B1 | | 2/2001 | McHugh |
| 6,341,622 | B1 | | 1/2002 | McHugh |
| 6,494,231 | B1 | * | 12/2002 | Fetz ........................ B29B 7/603 |
| | | | | 137/868 |
| 2004/0045604 | A1 | * | 3/2004 | Dunmire ............... F16K 15/033 |
| | | | | 137/512 |
| 2016/0201814 | A1 | * | 7/2016 | Chen ....................... F16K 24/06 |
| | | | | 137/527 |
| 2017/0023141 | A1 | * | 1/2017 | Andersson .......... F16K 27/0227 |
| 2017/0113083 | A1 | * | 4/2017 | Ringer ................. A62C 35/645 |
| 2017/0146137 | A1 | * | 5/2017 | Koelzer .............. F16K 27/0236 |
| 2018/0283563 | A1 | * | 10/2018 | Goto ................... F16K 31/1225 |

OTHER PUBLICATIONS

AGF Manufacturing, Inc.; www.testanddrain.com; Model 3011 Inspectors Test; Remote Inspector's Test; Aug. 2015; 2 pages.

AGF Manufacturing, Inc.; www.testanddrain.com; Pressure Relief Valves Sell Sheet for Model 7000 & Model 7200; Mar. 2017.

AGF Manufacturing; www.testanddrain.com; Test and Drain Model 2511A Valve Operating Instruction Sheet; 1 page.

\* cited by examiner

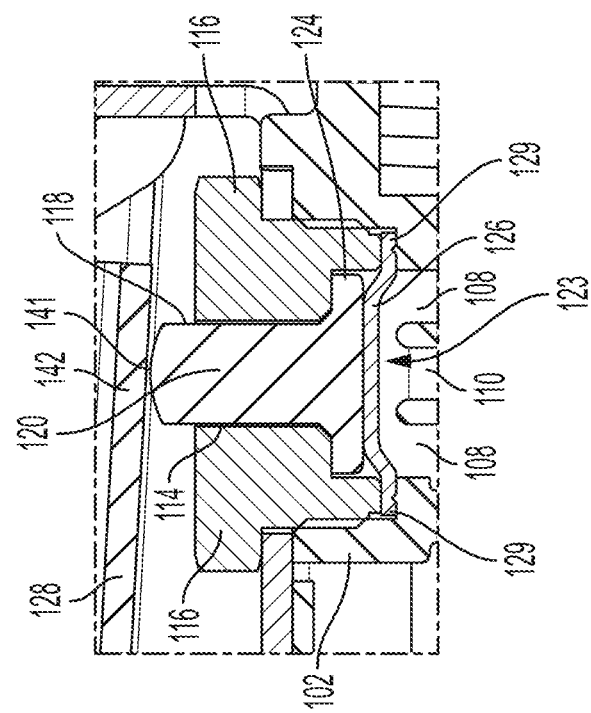
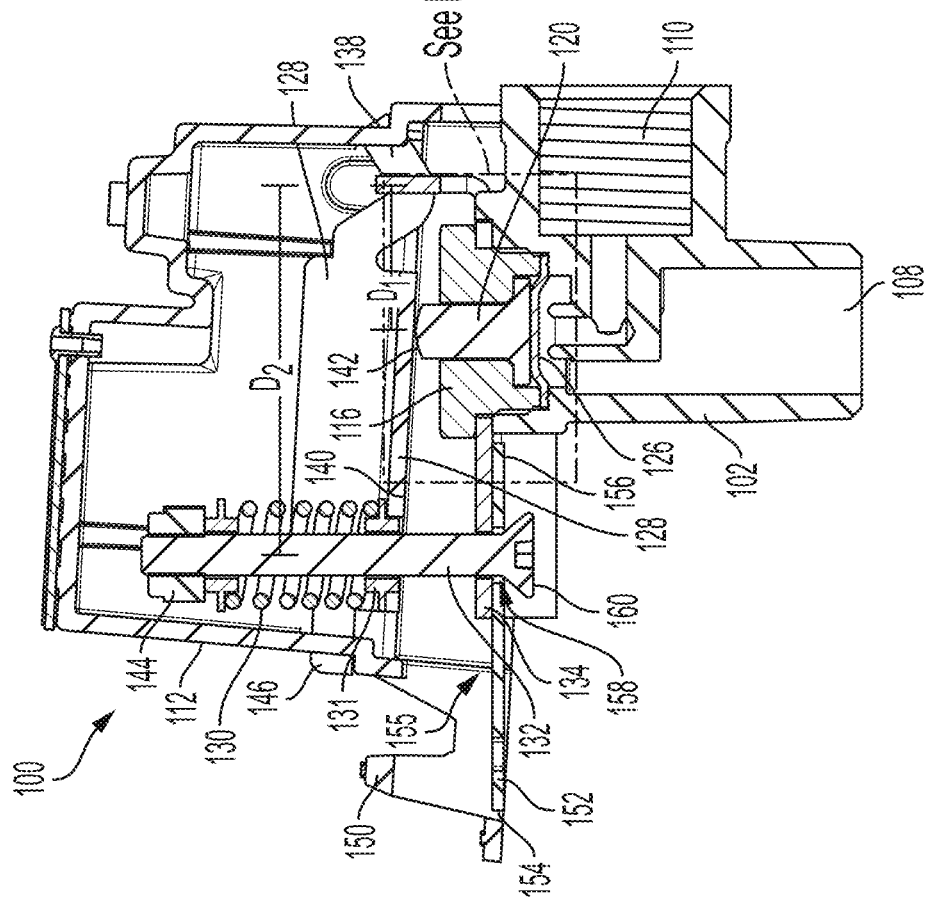

RELIEF VALVE

FIELD OF THE TECHNOLOGY

The subject disclosure relates to fluid control valves and more particularly to relief valves within high pressure systems, such as fire protection systems.

BACKGROUND OF THE TECHNOLOGY

Fire protection systems for buildings generally include water supply and distribution systems for supplying water to sprinklers, or similar mechanisms, throughout a building. Pressure relief valves are included on the distribution systems to prevent unwanted pressure from building up and potentially damaging pipes, valves, or other parts of the fire protection system. Pressure relief valves generally remain closed when the local pressure is under a set threshold for the valve. When the pressure exceeds the threshold, the valve opens and fluid passes through the valve to drain out of the system, relieving pressure within the fire protection system.

As fire protection systems have become rated for higher pressures, there has become a need for higher pressure rated pressure relief valves for such systems. However, existing pressure relief valves have difficulty functioning within a high pressure fire protection system (e.g. 300 PSI) in such a way that the relief valves remain closed during normal operation while still reliably opening at pressure significantly exceeding the operating pressure of the system.

Further, testing for fire protection systems typically includes testing the system at a significantly higher pressure than the normal operation pressure to ensure safe, leak free operation. Testing the system at a high pressure can be difficult when the system includes numerous pressure relief valves, as the pressure relief valves are normally designed to open under high pressure, allowing fluid to pass to a drain to prevent the system from exceeding a set pressure. One way to avoid pressure relief valves opening during testing is to remove the pressure relief valves from the system entirely, but this can be extremely time consuming and can require draining the entire system. Alternatively, the system can be tested before any pressure relief valves are installed, but this requires changes to the initial installation that must be reversed after testing and does not allow for future testing. Another approach has been to include an additional valve between each pressure relief valve and the main water distribution line which can be closed to isolate the pressure relief valve from the water distribution line. This approach suffers from the drawback that a dedicated valve is required for each pressure relief valve, increasing cost and complexity of the system.

SUMMARY OF THE TECHNOLOGY

As such, there is a need for a fire protection valve that is affordable, effective in high pressure systems, and allows for easy testing of the fire protection system without requiring additional work and/or system components.

In light of the needs described above, in at least one aspect, the subject technology relates to a relief valve which can be used in a fire protection system, or other system, that is capable of operating within high pressure systems while still allowing for easy testing.

In at least one aspect, the subject technology relates to a relief valve. A body defines an adaptor opening with a bottom surface, an inlet flowpath at the bottom surface, and an outlet flowpath at the bottom surface. A flexible disk is located against the bottom surface for selectively sealing fluid communication between the inlet flowpath and the outlet flowpath. A support member is secured to the body and has a planar portion defining a proximal spring rod opening and a distal passthrough, and a distal portion forming a fulcrum plate. An adaptor is secured in the adaptor opening and through the distal passthrough. A plunger has a top end is slidably mounted within the adaptor and a lower plunger head in a cavity formed by the adaptor and against the flexible disk. An actuating lever arm has a planar portion against the top end of the plunger, a distal end pivotally coupled to the fulcrum plate and a proximal end defining a spring rod hole. A spring rod passes through the spring rod opening of the support member and the spring rod hole of the actuating lever arm. The spring rod has a lock nut on a first end a forms a screwhead on a second end. A spring extends between the actuating lever arm and the lock nut. In a closed position, the spring exerts a closing force on the actuating lever arm so that the actuating lever arm presses the plunger head against the flexible disk to seal the inlet flowpath and the outlet flowpath. In an open position, fluid passing into the inlet flowpath deforms the flexible disk so that the outlet flowpath is in fluid communication with the inlet flowpath and the plunger moves the lever arm by overcoming the closing force.

In some embodiments, the valve includes a lockout lever arm having a spring rod bore, wherein the spring rod passes through the spring rod bore of the lockout lever arm for securing the lockout lever arm to the fulcrum plate. In a lockout position, the lockout lever arm is moved to pull the spring rod causing further compression of the spring to increase a cracking pressure of the relief valve. In some cases, a cover is coupled to the actuating lever arm, the cover configured to protect the spring, plunger and actuating lever arm from dust.

In some embodiments, the valve includes a tool extending between the cover and the lockout lever arm for setting the lockout position, the lockout position maintaining the spring in a compressed configuration when the valve is in the closed position. The tool can be selected from the group consisting of a hex wrench, a tie wrap, and a screwdriver. In some cases, a cover is coupled to the actuating lever arm, the cover configured such that, in a flush position, manually moving the cover causes a corresponding movement in the actuating lever arm which manually moves the valve into the open position. In some cases, when the cover is released, the valve returns to the closed position. In some cases, adjustment of the lock nut on the spring rod varies a compression of the spring to adjust a cracking pressure of the relief valve.

In at least one aspect, the subject technology relates to a relief valve. A body defines a cavity, an inlet flowpath fluidly connected to the cavity via a first opening in a bottom surface of the cavity and an outlet flowpath fluidly connected to the cavity via a second opening in the bottom surface of the cavity. A lever arm is pivotally coupled to the body to pivot around a pivot point between a closed position and an open position of the valve. A spring surrounds a spring rod and engages the lever arm at a first distance from the pivot point to compress when the lever arm pivots around the pivot point such that a compression force of the spring resists pivoting of the lever arm from the closed position to the open position. A plunger assembly is disposed within the cavity which includes a plunger and a disk, the disk proximal the bottom surface of the cavity. The plunger has a first end proximal the disk and a second end proximal a contact point of the lever arm such that a fluid pressure through the inlet flowpath acts on the disk to urge the plunger to contact the lever arm at the contact point to pivot the lever arm from the closed position to the open position. The contact point of the lever arm is at a second distance from the pivot point, the first distance being greater than the second distance. The plunger assembly seals the first and second openings with the disk when the lever arm is in the closed position and is movable to allow fluid to pass between the inlet flowpath and outlet flowpath when the lever arm is in the open position.

In some embodiments, the disk is a flexible membrane configured to flex in response to the fluid pressure through the inlet flowpath, forcing the lever arm into the open position when a predetermined pressure is exceeded to allow fluid to flow into the cavity and pass between the inlet flowpath and the outlet flowpath. In some cases, the valve includes a protective cover housing the spring, spring rod, and lever arm, the protective cover connected to the lever arm to move in unison with the lever arm such that lifting the protective cover causes the lever arm to move from the closed position to the open position.

In some embodiments, a lockout lever arm is pivotally connected to the spring rod to move between a default position and a compressed position. In the default position, the spring is configured to compress in response to a predetermined inlet pressure. In the compressed position, the spring is further compressed with respect to the default position to increase a cracking pressure of the valve for testing. In some cases, the lockout lever arm includes a distal end distal to the spring rod, the distal end exposed through a passage in the cover and configured to be attached to the housing to retain the lockout lever arm in the compressed position. In some cases, the second opening is centrally positioned within the cavity and the first opening is ring-shaped and surrounds the second opening.

In at least one aspect, the subject technology relates to a relief valve. A body defines a cavity, an inlet flowpath, and an outlet flowpath, the cavity fluidly connecting the inlet flowpath and the outlet flowpath. A lever arm is pivotally coupled to the body to pivot around a pivot point between a closed position and an open position of the valve. A spring engages the lever arm at a first distance from the pivot point to compress when the lever arm pivots around the pivot point such that a compression force of the spring resists pivoting of the lever arm from the closed position to the open position. A plunger assembly is disposed within the cavity, the plunger assembly including a first end sealing the cavity from the inlet flowpath and the outlet flowpath in the closed position. A second end of the plunger assembly is proximal a contact point of the lever arm. The plunger assembly is positioned to contact the contact point and urge the lever arm to pivot from the closed position to the open position in response to a fluid pressure from the inlet flowpath such that the plunger allows fluid to pass through the cavity between the inlet flowpath and outlet flowpath. The contact point is a second distance from the pivot point, the first distance being greater than the second distance.

In some embodiments, the first end of the a plunger assembly includes a disk, the disk being a flexible membrane configured to flex in response to the fluid pressure through the inlet flowpath, forcing the lever arm into the open position to allow fluid to flow into the cavity and pass between the inlet flowpath and the outlet flowpath. In some cases, the inlet flowpath is fluidly connected to the cavity via a first opening in a bottom surface of the cavity. The outlet flowpath can be fluidly connected to the cavity via a second opening in the bottom surface of the cavity.

In some embodiments, the second opening is centrally positioned within the cavity. The first opening can then be ring-shaped, surrounding the second opening. In some cases the relief valve includes a covering housing the relief valve, including the body, lever arm, spring, and plunger assembly. In some cases, the compression force of the spring is based on an expected pressure within a fire protection system.

BRIEF DESCRIPTION OF THE DRAWINGS

So that those having ordinary skill in the art to which the disclosed system pertains will more readily understand how to make and use the same, reference may be had to the following drawings.

FIG. 3A is a vertical cross-sectional view of the valve of FIG. 1, taken from the center of the valve, with the valve in an open position.

FIG. 3B is a zoomed-in view of a portion of the valve of FIG. 3A.

DETAILED DESCRIPTION

Figure 1:
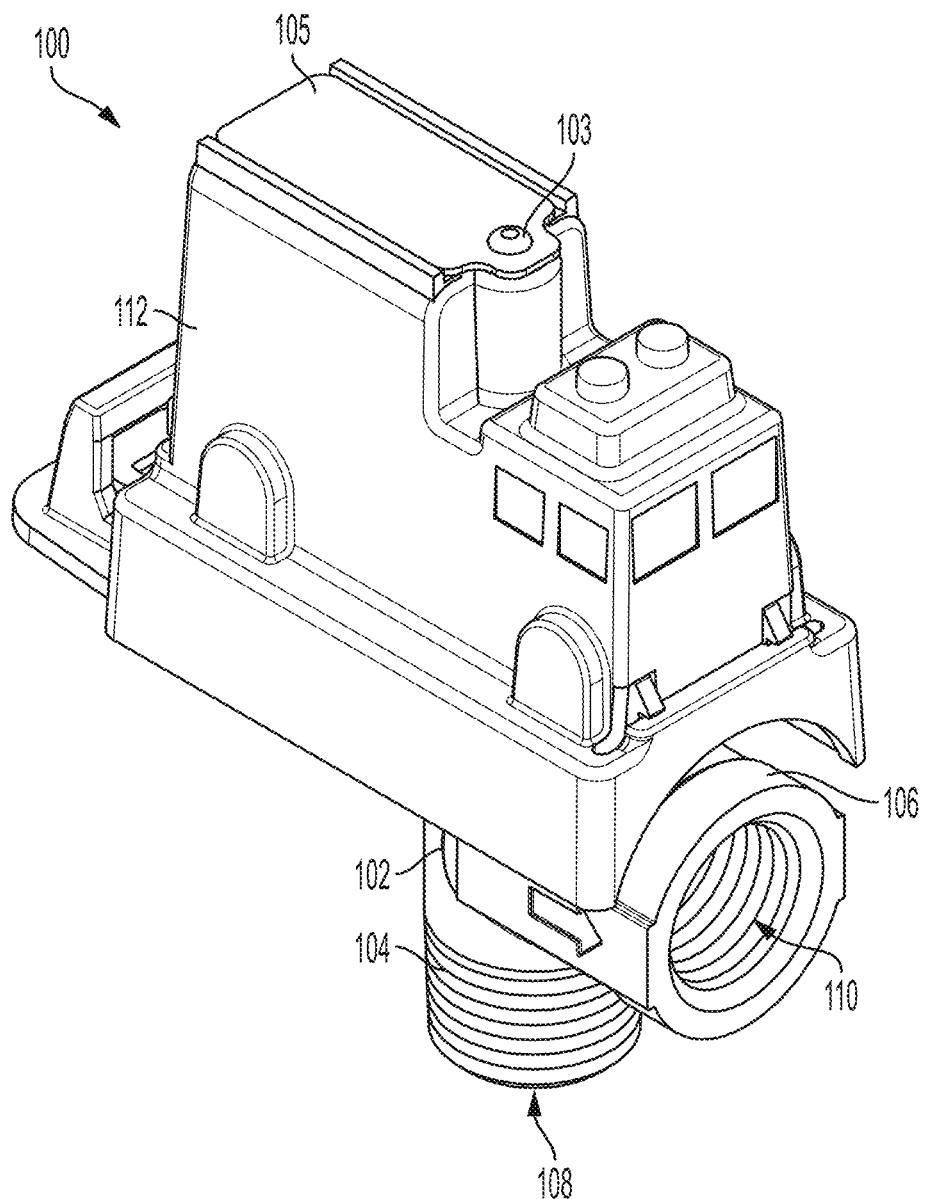
FIG. 1 is a front-side perspective view of a valve in accordance with the subject technology.

The subject technology overcomes many of the prior art problems associated with relief valves. In brief summary, the subject technology provides a reliable, high pressure rated relief valve with a lockout feature. The advantages, and other features of the systems and methods disclosed herein, will become more readily apparent to those having ordinary skill in the art from the following detailed description of certain preferred embodiments taken in conjunction with the drawings which set forth representative embodiments of the subject technology. Like reference numerals are used herein to denote like parts. Further, words denoting orientation such as "upper", "lower", "distal", and "proximal" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation).

Referring now to FIG. 1, a perspective view of a relief valve 100 in accordance with the subject technology is shown. The valve 100 has a body 102 which includes an inlet 104 and an outlet 106. The inlet 104 connects to a water pipe of a fire protection system (not distinctly shown), and forms an inlet flowpath 108 from the fire protection system into the valve 100. The outlet 106 connects to a drain pipe (not distinctly shown) or the like, forming an outlet flowpath 110 which passes water from the valve 100 to a drain. A cover 112 provides a protective housing for the inner workings of the valve 100, and also functions as part of a lockout feature, as will be discussed in more detail below. A faceplate 105 is secured to the top of the cover 112 by a screw 103. The faceplate 105 can include information about the valve 100, such the valve specifications, the valve manufacturer, a logo, or the like (not distinctly shown). Notably, while a fire protection system is used herein by way of example, it should be understood that the valve is equally suited for other systems, and particularly other high pressure water distribution systems.

Figure 2B:
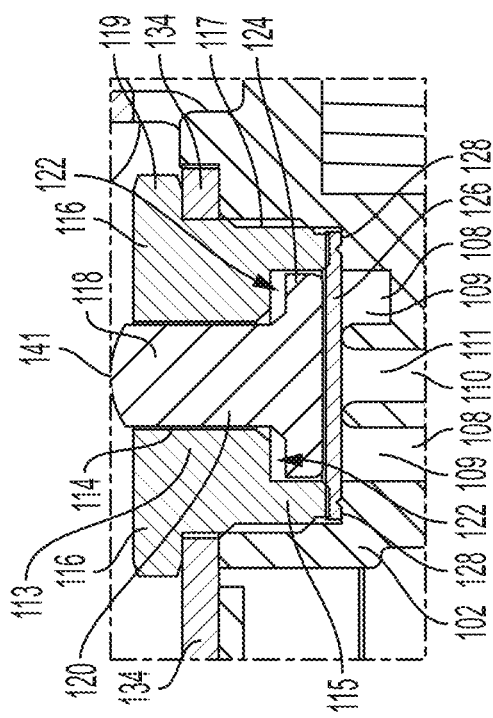
FIG. 2B is a zoomed-in view of a portion of the valve of FIG. 2A.
Figure 2A:
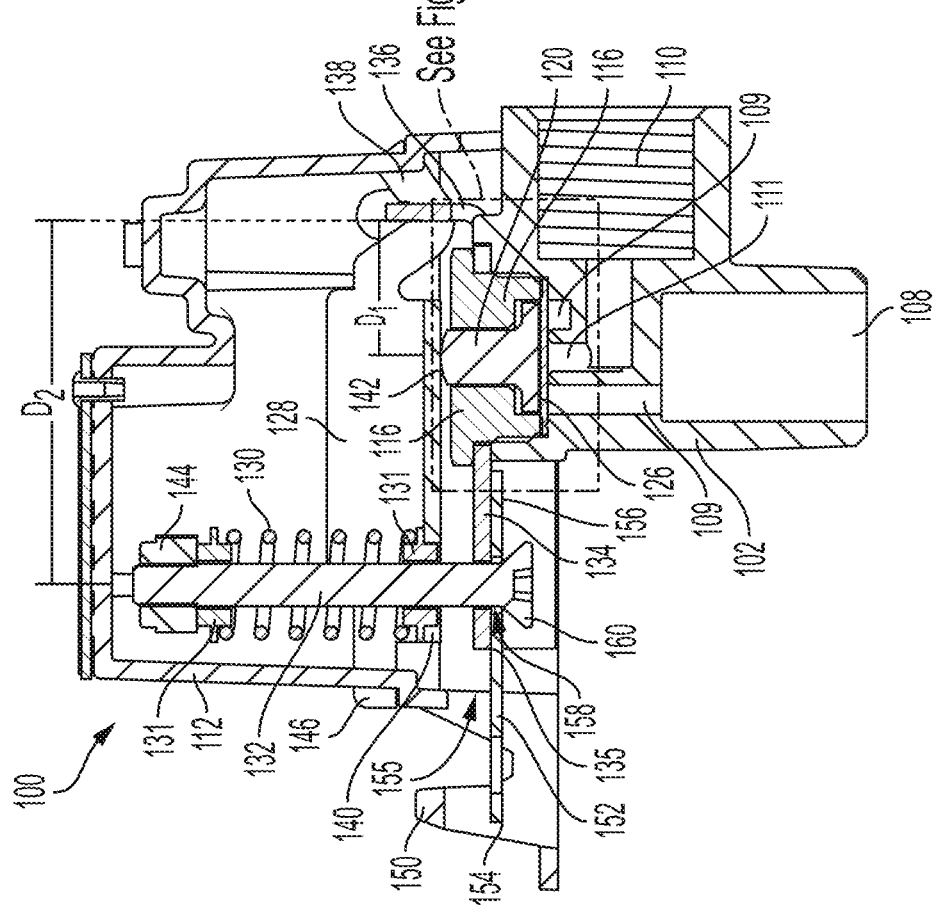
FIG. 2A is a vertical cross-sectional view of the valve of FIG. 1, taken from the center of the valve, with the valve in a closed position.
Figure 6A:
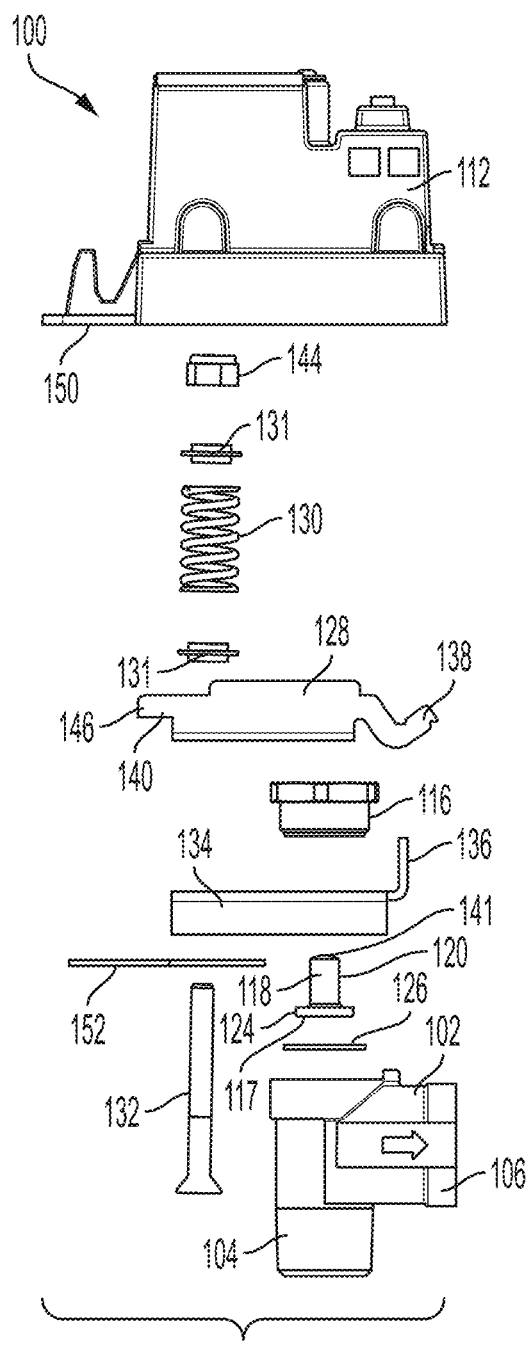
FIG. 6A is a side exploded view of the components of the valve of FIG. 1.
Figure 6B:
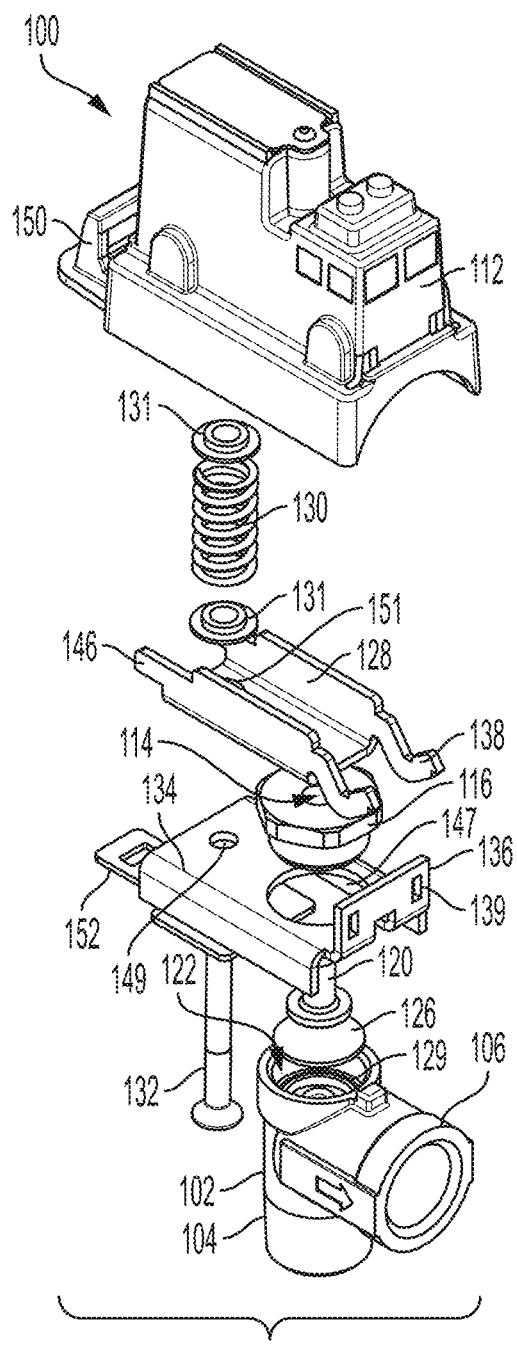
FIG. 6B is a perspective exploded view of the components of the valve of FIG. 1.

Referring now to FIGS. 2A, 2B, 3A, and 3B, vertical cross-sectional views from the center of the relief valve 100 are shown. In FIGS. 2A-2B, the valve 100 is shown in a closed position, while in FIGS. 3A-3B the valve 100 is shown in an open position with the lever arm 128 rotated upward, as will be discussed in more detail below. For clarity, exploded views of the valve 100 components can be seen in FIGS. 6A-6B.

The valve 100 includes a plunger assembly 120 with a disk 126, and a plunger 117 comprising a plunger stem 118 and a plunger head 124. An adaptor 116 within the valve body 102 has an upper section 113 that forms a passage 114 which guides vertical movement of the stem 118. The passage 114 and plunger 117 are sized and configured to create ample freedom of movement with robust repeatability without finicky alignment or a requirement of a large spring load.

The adaptor 116 also includes a lower section 115 which forms a circular cavity 122. Flow through the valve body 102 is controlled by the positioning the plunger assembly 120 within the cavity 122. In one embodiment, the adaptor 116 is integral with the valve body 102. As shown, the adaptor 116 threads into an opening 117 formed in the valve body 102. The adaptor 116 also has an upper flange 119.

The plunger assembly 120 includes a circular disk 126, adjacent to the plunger head 124 and fixed within the cavity 122 between the plunger head 124 and a seat surface 129 of the body 102. The lower section 115 of the adaptor 116 is shaped as a circular ring. Thus, as the adaptor 116 is threaded into the valve body 102, the lower section 115 presses the periphery of the disk 126 against the seat surface 129 to fix the disk 126 in place. As a result, the disk 126 is robustly sealed in place about the openings 109, 111 for very high pressure applications. Additionally, the disk 126 seals the moving parts (e.g., spring 130, lever arm 128, plunger head 124 etc.) so that the moving parts are not exposed to water. As best seen in FIG. 3B, when the disk 126 flexes upward, a flowpath portion 123 of the cavity 122 is formed to create the fluid communication between the inlet flowpath 108 and the outlet flowpath 110. Still further, the disk 126 is set so that risk of damage during hydro testing is reduced.

Figure 5:
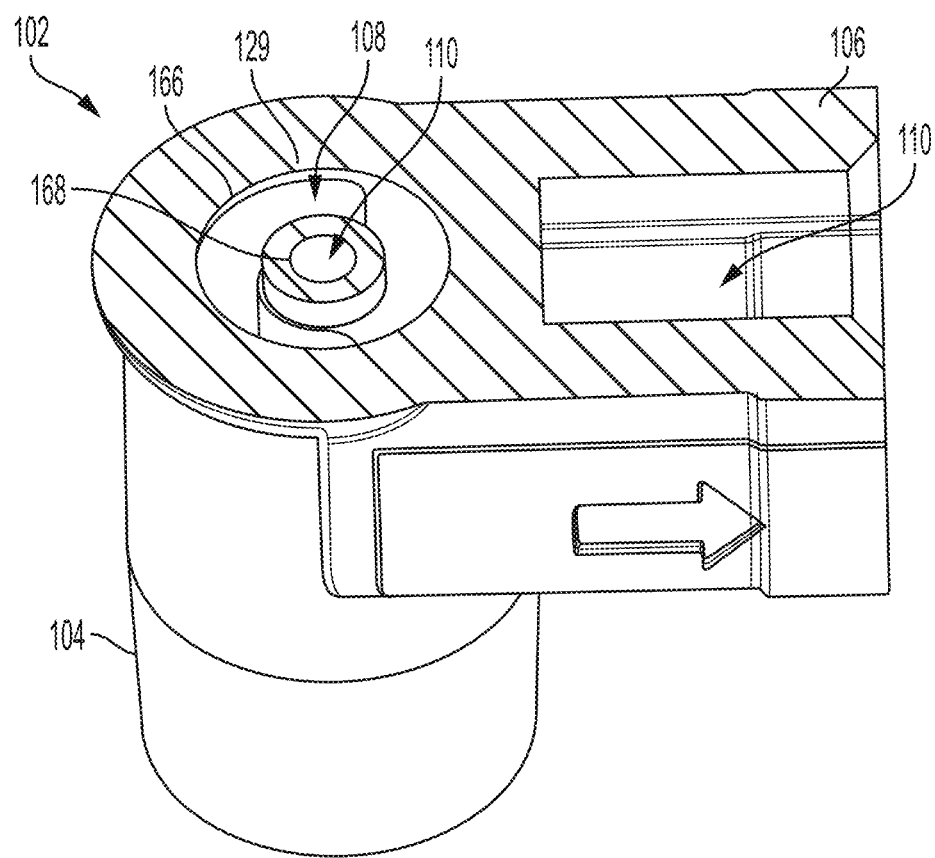
FIG. 5 is a horizontal cross section of the body of the valve of FIG. 1.

The disk 126 selectively seals the opening 109 to the inlet flowpath 108 and the opening 111 to the outlet flowpath 110. As best seen in FIGS. 2A and 3A, the openings 109, 111 into the cavity 122 are necked down compared to the respective inlet flowpath 108 and outlet flowpath 110. As best seen in FIG. 5, the inlet opening 109 forms an annular trough and the outlet opening 111 is a smaller circle centered in the inlet opening 109. However, there is still a large effective diaphragm area for opening the valve 100 by deflecting the disk 126 for opening pressure accuracy with the smaller diameter outlet opening 111 for faster reseating performance.

The disk 126 can be a rubber silicone, or the like, and forms a flexible membrane. In the closed position (FIGS. 2A-2B), the plunger head 124 of the plunger assembly 120 holds the disk 126 against the seat surface 129 of the cavity 122 to seal the opening 109 to the inlet flowpath 108 and opening 111 to the outlet flowpath 110 such that fluid does not pass through the valve body 102. During normal operation, when the pressure in the inlet channel 108 exceeds a predetermined cracking pressure for the valve 100, the valve 100 is forced into the open position (FIGS. 3A-3B). In such a case as sown in FIGS. 3A and 3B, fluid from the inlet channel 108 applies pressure to the disk 126, causing the disk 126 to flex and move the plunger assembly 120 upward, creating a fluid connection through the cavity 122 between the openings of the inlet flowpath 108 and the outlet flowpath 110. Fluid can then pass from the inlet flowpath 108, underneath the flexed disk 126, and to the outlet flowpath 110 to a drain. Notably, while the use of the disk 126 has been found to be advantageous, it should be noted that the disk 126 need not be used in all cases, and other mechanisms can be used to create a seal between the inlet and outlet flowpaths 108, 110 when the valve 100 is in the closed position.

Being designed for pressure relief, the valve 100 is configured to open, during normal operation, once pressure within the fire protection system (from the inlet flowpath 108) exceeds a predetermined pressure. In particular, the valve 100 is designed for use in a high pressure fire protection system (i.e. greater than 300 PSI), and therefore is configured to open only if the current pressure is greater than the expected operating pressure of the system by a reasonable margin. To help ensure that the valve 100 remains closed even when exposed to the high operating pressure of the system, a lever arm 128 is used in combination with a spring 130.

The spring 130 is positioned around a spring rod 132, which guides movement of the spring 130 along the elongated length of the spring rod 132. The spring rod 132 is fixedly connected to the valve body 102 by a support member 134. The spring rod 132 passes through a bore 149 in the support member 134 and a bore 151 in the lever arm 128. The support member 134 can be secured between the valve body 102 and the adaptor 116 such that the support member 134 is held in a fixed orientation with respect to the valve body 102. Preferably, the adaptor 116 passes through a large hole 147 in the support member 134. A flange 119 on the adaptor 116 captures the plate 134 against the valve body 102. The spring rod 132 is positioned on a first side of the plunger assembly 120, while the support member 134 forms a fulcrum plate 136 on the second, opposite side of the plunger assembly 120. The lever arm 128 has arms 138 seated in slots 139 in the fulcrum plate 136 to pivot vertically, with the fulcrum plate 136 as a fixed pivot point. The lever arm 128 extends between the fulcrum plate 136 and the spring 130. A second end 140 of the lever arm 128 is configured to engage a spring end fixture 131 coupled to the spring 130 such that the spring 130 resists vertical movement of the lever arm 128.

The top 141 of the plunger assembly 128 contacts an intermediate location 142 of the lever arm 128, between the fulcrum plate 136 and the spring 130. Therefore, when the plunger assembly 120 is forced upwards by fluid pressure from the inlet flowpath 108, the plunger assembly 120 contacts the lever arm 128 and urges the lever arm 128 to rotate vertically around the fulcrum plate 136. The upward force from the rotation of the lever arm 128 then urges the spring 130 to compress against an upper lock nut 144. Thus, the compression force of the spring 130 resists the pivoting motion of the lever arm 128 and maintains the valve 100 in the closed position unless the compression force of the spring 130 is overcome. Adjustments can be made to the lock nut 144 or spring rod 132 to increase or decrease the compression of the spring 130 in an at rest position, changing the cracking pressure required within the inlet 108 to open the valve 100. The spring 130 is shown at a default, exemplary level of compression in FIGS. 2A, 3A.

The positioning of the lever arm 128 provides a much greater moment at the spring 130 than at the plunger assembly 120 for the same amount of force. This is accomplished through the differences in where the spring 130 and plunger assembly 120 contact the lever arm 128, with respect to the fulcrum plate 136, which acts as the hinge for the lever arm 128. The spring 130 contacts the lever arm 128 at the end 140 furthest from the fulcrum plate 136, while the plunger assembly 120 contacts the lever arm 128 at an intermediate point 142 on the lever arm 128. Therefore, the force from the plunger assembly 120, as a result of fluid pressure from the inlet flowpath 108, acts on the lever arm 128 at a much shorter distance D1 from the fulcrum plate 136 than the distance D2 between the fulcrum plate 136 and the spring 130. The spring 130 is able to match the moment in the lever arm 128 with a much smaller force than that applied to the lever arm 128 by the plunger assembly 120. This way, the valve 100 can maintain a closed position even when the pressure within the inlet flowpath 108 would ordinarily cause the spring 130 to compress in the case where no lever arm 128 were implemented. This advantageous positioning eliminates the need to provide a significantly more robust spring, or implement alternative options that could result in a costly and/or cumbersome valve, to allow the valve 100 to effectively operate effectively in a high pressure environment.

Figure 4B:
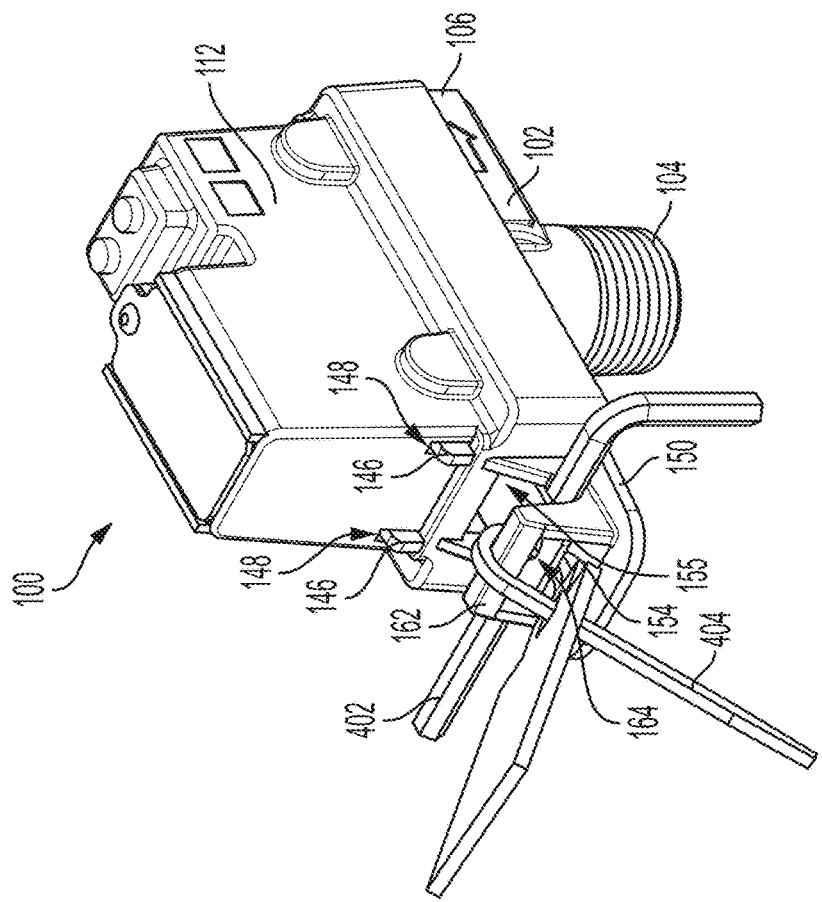
FIG. 4B is a rear-side view of the valve of FIG. 1 in a locked-out position for testing.
Figure 4A:
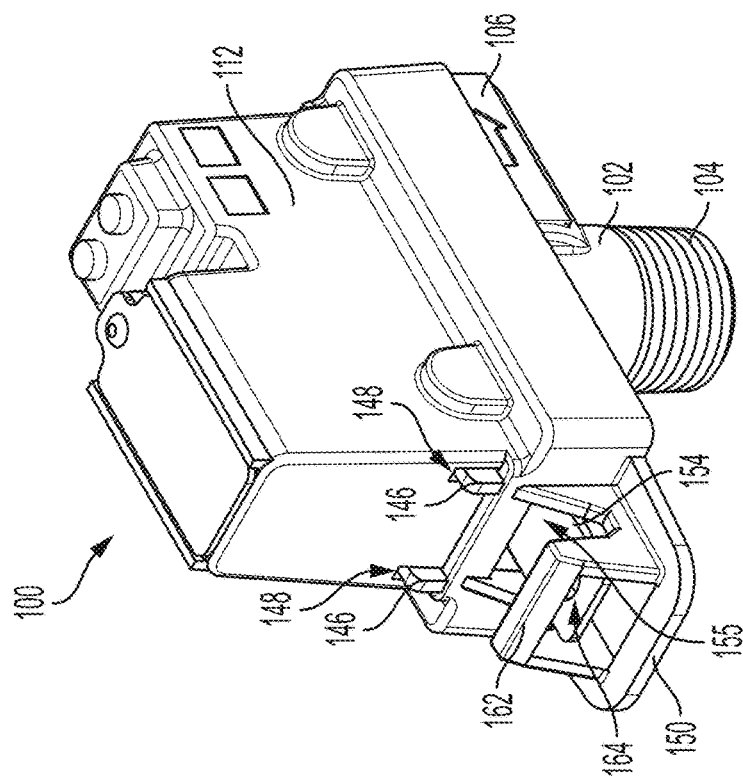
FIG. 4A is a rear-side view of the valve of FIG. 1.

Referring now to FIGS. 4A, 4B, perspective views of a fire protection valve 100 in accordance with the subject technology are shown. The fire protection valve 100 can be configured in accordance with the valves 100 discussed above, except as otherwise shown and described herein. As shown in FIGS. 4A, 4B, the valve 100 is in the closed position, and in FIG. 4B, a hex wrench 402 and tie wrap 404 are interlocked with the valve 100 to lock-out the valve 100, preventing the valve 100 from opening during testing of a fire protection system.

As can be seen in FIGS. 1-4B, the valve cover 112 engages with the lever arm 128. In particular, the end 140 of the lever arm 128 forms two pins 146 which are seated within guide slots 148 of the cover 112, on the side of the cover 112 proximal the spring 130. On the same side of the cover 112, a tailgate 150 extends outwardly. When the valve 100 moves from the closed position of FIG. 2A to the open position of FIG. 3A, the pins 146 of the lever arm 128 act on the guides 148 of the cover 112 such that the cover 112 pivots upwards with the lever arm 128. In another embodiment, the guide slots 148 are sized so that the pins 146 simply move within the slots 148 and the cover remains stationary.

The pins 146 of the lever arm 128 being engaged in the slots 148 of the tailgate 150 allows the valve 100 to be manually flushed by lifting the tailgate 150, which in turn lifts the lever arm 128 and allows the plunger 117 to move upward so that the disk 126 can easily deflect to open the valve 100. Manual flushing by lifting the tailgate 150 can help quickly and efficiently clear the valve 100 of debris, and/or ensure that the valve 100 has not become stuck during an extended period of non-use.

The valve 100 also includes a lower lockout lever arm 152, which extends, at a distal side 154 (with respect to the valve body 102), out of a passage 155 in the cover 112 adjacent to the tailgate 150. On a proximal side 156 of the lockout lever arm 152, the spring rod 132 runs through a spring rod bore 158 of the lockout lever arm 152. A wide lower bolthead 160 of the spring rod 132 secures the lockout lever arm 152 between the support member 134 and the spring rod 132. As the bolthead 160 is normally biased upward by the spring 130, the proximal side 156 of the lockout lever arm 152 is also normally biased upward.

In order to lockout the valve 100, the lockout lever arm 152 is moved upwards at the distal side 154, causing proximal side 156 of the lockout lever arm 152 to pivot downward, with the end 135 of the support member 134 acting as an intermediate pivot point. The downward motion of the proximal side 156 of the lockout lever arm 152 pulls the spring rod bolthead 160 down, further compressing the spring 130 against the lever arm 128. The hex wrench 402 can then be inserted between the tailgate 150 and the distal end 154 of the lockout lever arm 152 to maintain this position. With the spring 130 compressed in this manner, the cracking pressure required from the inlet flowpath 108 to move the lever arm 128, and thus the spring 130, is greater. Therefore, the valve 100 can be locked out in this manner, increasing the cracking pressure above the test pressure required for testing the high pressure relief valve 100. The system can then be tested at a high pressure above the set cracking pressure without risk of the valve 100 opening.

Notably, while a hex rod 402 is given as an exemplary tool for locking out the valve 100, it should be understood that other functionally similar tools could also be used. For example, a screwdriver, bar, or other device could be inserted between the lockout lever arm 152 and tailgate 150 to hold the lockout lever arm 152 in the elevated, locked out state. The tailgate 150 also includes a support bar 162 and the lockout lever arm 152 includes an aperture 164 on the distal side 154. As an additional or alternative lock out mechanism, the tie wrap 404 shown in FIG. 4B can be included. The tie wrap 404 loops through the aperture 164 in the lever arm 152 and around the support bar 162, locking with itself to hold the lockout lever arm 152 in the elevated position with respect to the tailgate 150. Notably, while the tie wrap 404 is shown as being used in addition to the hex wrench 402 in FIG. 4b, it should be understood that the tie wrap 404, or similar looping mechanism, could also be used as an alternative to the hex wrench 402. It is noteworthy that when the hex rod 402 and/or tie wrap 404 are removed, the valve automatically returns to the nominal setting without further user intervention.

Referring now to FIG. 5, a horizontal cross section of the valve body 102 taken from just below the cavity 122 is shown. The inlet flowpath 108 feeds into the cavity 122 through the inlet opening 166 in the valve body 102. Fluid can then flow out of the cavity 122 by entering the outlet flowpath 110 through the outlet opening 168. Notably, it can be a challenge to balance the flow of liquid into the cavity 122 from the inlet flowpath 108 and the flow of liquid out of the cavity 122 through outlet flowpath 110, since it is difficult for both flowpaths 108, 110 to feed to or from the center of the disk 126 and cavity 122. As such, in the example given, the outlet opening 168 is circular and positioned in the center of the valve body 102, which is also centrally within the cavity 122. The inlet opening 166 is ring-shaped, such that pressure from the inlet flowpath 108 acts on an extensive area of the disk 126. Further, the position of the inlet opening 166, surrounding the entire centrally placed outlet opening 168, allows pressure from the inlet flowpath 108 to act around the center of the disk 126, causing the disk 126 to flex and expand uniformly around the center while fluid can still easily flow between the inlet flowpath 108 and outlet flowpath 110.

Further, it should be noted that the tailgate 150, and related lockout and flush capabilities as shown and described in the above exemplary embodiments are optional features which need not be included in all cases. For example, in another embodiment, no tailgate 150 is included. The cover 112 still includes a passage 155 and support member 134 extends outward therefrom, adjacent to lower lockout lever arm 152. The distal side 154 of the lockout lower lever arm 152 includes a downward bend spaced from the support member 134. Manually pushing the downward bend on the distal side 154 upwards, such that the downward bend approaches support member 134, causes the lockout lever arm 152 to pivot around a contact point with the support member 134. This moves the bolthead 160 downward to further compress the spring 130, increasing the cracking pressure required to open the valve 100. The pivoting motion of the lower lockout lever arm 152 also causes the proximal side 156 of the lower lockout lever arm 152 to separate from the support member 134. The cover 112 can include an opening adjacent the area of the separation. A tool can then be inserted into the opening such that the tool is wedged between the support member 134 and the proximal side 156 of the lower lockout lever arm 152 to maintain the separation, ensuring increased cracking pressure during testing. Alternatively, the support member 134 includes an aperture so that a tie wrap can be used to retain the lever arm 152 in the locked out position. Further, the valve 100 may also include an extension of lever arm 128 which extends past the spring 130 and protrudes from the passage 155, such that the extension is accessible to a user. The extension of the lever arm 128 may then be lifted manually to flush the valve 100. Releasing the extension of the lever arm 128 will then allow the valve 100 to return to its normal position.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A relief valve comprising:
   a body defining a cavity, an inlet flowpath, and an outlet flowpath, the cavity fluidly connecting the inlet flowpath and the outlet flowpath;
   a lever arm pivotally coupled to the body to pivot around a pivot point between a closed position and an open position of the valve;
   a spring engaging the lever arm to compress when the lever arm pivots around the pivot point such that a compression force of the spring resists pivoting of the lever arm from the closed position to the open position;
   a plunger assembly disposed within the cavity, the plunger assembly including a first end sealing the cavity from the inlet flowpath and the outlet flowpath in the closed position and a second end proximal the lever arm, the second end of the plunger assembly positioned to contact and urge the lever arm to pivot from the closed position to the open position in response to a fluid pressure from the inlet flowpath such that the first end of the plunger allows fluid to pass through the cavity between the inlet flowpath and outlet flowpath,
   wherein: the inlet flowpath is fluidly connected to the cavity via a first opening in a bottom surface of the cavity; the outlet flowpath is fluidly connected to the cavity via a second opening in the bottom surface of the cavity; the second opening is centrally positioned within the cavity; and the first opening is ring-shaped and surrounds the second opening.

2. The relief valve of claim 1, wherein the first end of the plunger assembly includes a disk, the disk being a flexible membrane configured to flex in response to the fluid pressure through the inlet flowpath, forcing the lever arm into the open position to allow fluid to flow into the cavity and pass between the inlet flowpath and the outlet flowpath.

3. The relief valve of claim 1, wherein the relief valve further comprises a covering housing the relief valve, including the body, lever arm, spring, and plunger assembly.

4. The relief valve of claim 1, wherein: the spring engages the lever arm at a first distance from the pivot point; the plunger assembly engages the lever arm at a contact point being a second distance from the pivot point; the first distance is greater than the second distance; and the compression force of the spring is based on an expected pressure within a fire protection system.

5. A relief valve comprising:
   a body defining a cavity, an inlet flowpath, and an outlet flowpath, the cavity fluidly connecting the inlet flowpath and the outlet flowpath;
   a lever arm pivotally coupled to the body to pivot around a pivot point between a closed position and an open position of the valve;
   a spring engaging the lever arm at a first distance from the pivot point to compress when the lever arm pivots around the pivot point such that a compression force of the spring resists pivoting of the lever arm from the closed position to the open position;
   a plunger assembly disposed within the cavity, the plunger assembly including a first end sealing the cavity from the inlet flowpath and the outlet flowpath in the closed position and a second end proximal a contact point of the lever arm, the plunger assembly positioned to contact the contact point and urge the lever arm to pivot from the closed position to the open position in response to a fluid pressure from the inlet flowpath such that the plunger allows fluid to pass through the cavity between the inlet flowpath and outlet flowpath,
   wherein: the contact point is a second distance from the pivot point; and the first distance is greater than the second distance; and the first end of the plunger assembly includes a disk, the disk being a flexible membrane configured to flex in response to the fluid pressure through the inlet flowpath, forcing the lever arm into the open position to allow fluid to flow into the cavity and pass between the inlet flowpath and the outlet flowpath.

6. A relief valve comprising:
   a body defining: an adaptor opening with a bottom surface; an inlet flowpath at the bottom surface; and an outlet flowpath at the bottom surface;

a flexible disk located against the bottom surface for selectively sealing fluid communication between the inlet flowpath and the outlet flowpath;

a support member secured to the body and having: a proximal portion defining a spring rod opening; and a distal portion forming a fulcrum plate;

an adaptor secured in the adaptor opening;

a plunger slidably mounted within the adaptor and against the flexible disk;

an actuating lever arm having: a distal end pivotally coupled to the fulcrum plate; and a proximal end defining a spring rod hole;

a spring rod passing through the spring rod opening of the support member and the spring rod hole of the actuating lever arm;

a lock nut on the spring rod; and a spring extending between the actuating lever arm and the lock nut, wherein:

in a closed position, the spring exerts a closing force on the actuating lever arm so that the actuating lever arm presses the plunger against the flexible disk to seal the inlet flowpath and the outlet flowpath; and in an open position, fluid passing into the inlet flowpath deforms the flexible disk so that the outlet flowpath is in fluid communication with the inlet flowpath and the plunger moves the lever arm by overcoming the closing force.

7. The relief valve of claim 6, further comprising a lockout lever arm having a spring rod bore, wherein the spring rod passes through the spring rod bore of the lockout lever arm for securing the lockout lever arm to the fulcrum plate, wherein in a lockout position, the lockout lever arm is moved to pull the spring rod causing further compression of the spring to increase a cracking pressure of the relief valve.

8. The relief valve of claim 7, further comprising a cover coupled to the actuating lever arm, the cover configured to protect the spring, plunger and actuating lever arm from dust.

9. The relief valve of claim 8, further comprising a tool extending between the cover and the lockout lever arm for setting the lockout position, the lockout position maintaining the spring in a compressed configuration when the valve is in the closed position.

10. The relief valve of claim 9, wherein the tool is selected from the group consisting of a hex wrench, a tie wrap, and a screwdriver.

11. The relief valve of claim 6, further comprising a cover coupled to the actuating lever arm, the cover configured such that, in a flush position, manually moving the cover causes a corresponding movement in the actuating lever arm which manually moves the valve into the open position.

12. The relief valve of claim 11, wherein when the cover is released, the valve returns to the closed position.

13. The relief valve of claim 11, wherein adjustment of the lock nut on the spring rod varies a compression of the spring to adjust a cracking pressure of the relief valve.

14. A relief valve comprising:

a body defining a cavity, an inlet flowpath fluidly connected to the cavity via a first opening in a bottom surface of the cavity, an outlet flowpath fluidly connected to the cavity via a second opening in the bottom surface of the cavity;

a lever arm pivotally coupled to the body to pivot around a pivot point between a closed position and an open position of the valve;

a spring engaging the lever arm to compress when the lever arm pivots around the pivot point such that a compression force of the spring resists pivoting of the lever arm from the closed position to the open position;

a plunger assembly disposed within the cavity and including a plunger and a disk, the disk proximal the bottom surface of the cavity such that a fluid pressure through the inlet flowpath acts on the disk to urge the plunger to contact the lever arm to pivot the lever arm from the closed position to the open position, the plunger assembly sealing the first and second openings with the disk when the lever arm is in the closed position and movable to allow fluid to pass between the inlet flowpath and outlet flowpath when the lever arm is in the open position; and a protective cover housing the spring and the lever arm, the protective cover connected to the lever arm to move in unison with the lever arm such that lifting the protective cover causes the lever arm to move from the closed position to the open position.

15. The valve of claim 14, wherein: the spring engages the lever arm at a first distance from the pivot point; the plunger engages the lever arm at a contact point being a second distance from the pivot point; the first distance is greater than the second distance; and the disk is a flexible membrane configured to flex in response to the fluid pressure through the inlet flowpath, forcing the lever arm into the open position when a predetermined pressure is exceeded to allow fluid to flow into the cavity and pass between the inlet flowpath and the outlet flowpath.

16. The valve of claim 14, further comprising a lockout lever arm pivotally connected to a spring rod to move between a default position and a compressed position, wherein, in the default position, the spring is configured to compress in response to a predetermined inlet pressure, and in the compressed position, the spring is further compressed with respect to the default position to increase a cracking pressure of the valve for testing.

17. The valve of claim 16, wherein the lockout lever arm includes a distal end distal to the spring rod, the distal end exposed through a passage in the cover and configured to be fixed in a raised position to increase a cracking pressure of the valve.

18. The valve of claim 14, wherein:

the second opening is centrally positioned within the cavity; and the first opening is ring-shaped and surrounds the second opening.

19. The valve of claim 14, wherein: the spring surrounds a spring rod, the spring engages the lever arm at a first distance from the pivot point; the plunger has a first end proximal the disk and a second end proximal a contact point of the lever arm so that the plunger contacts the lever arm at the contact point; the contact point of the lever arm being at a second distance from the pivot point; and the first distance being greater than the second distance, and the protective cover houses the spring rod.

* * * * *